(No Model.)  3 Sheets—Sheet 1.
B. C. THRASHER.
MOTOR.
No. 512,633.  Patented Jan. 9, 1894.
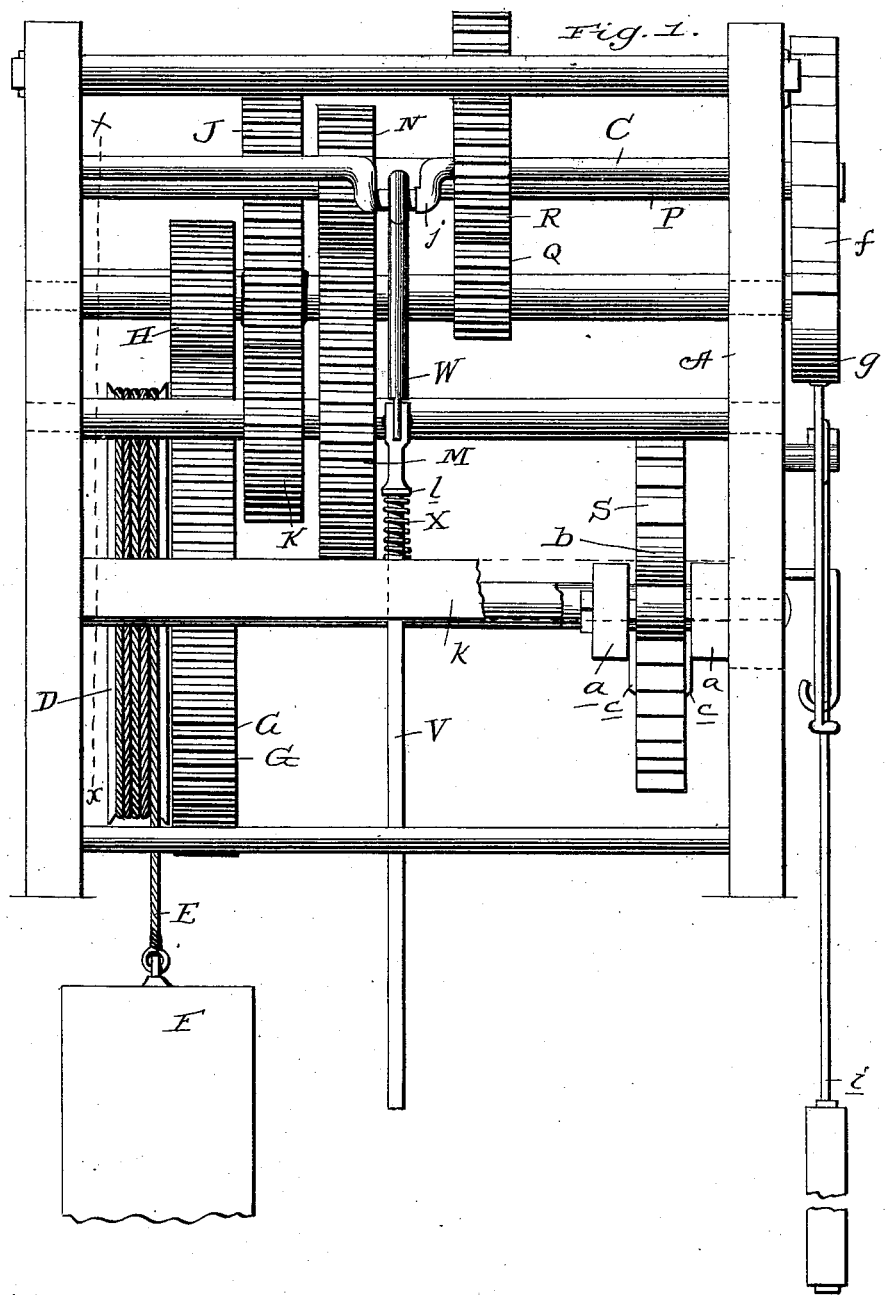
Witnesses:
C. H. Raeder
N. F. Matthews
Inventor
Benton C. Thrasher
By James J. Shehy
Attorney

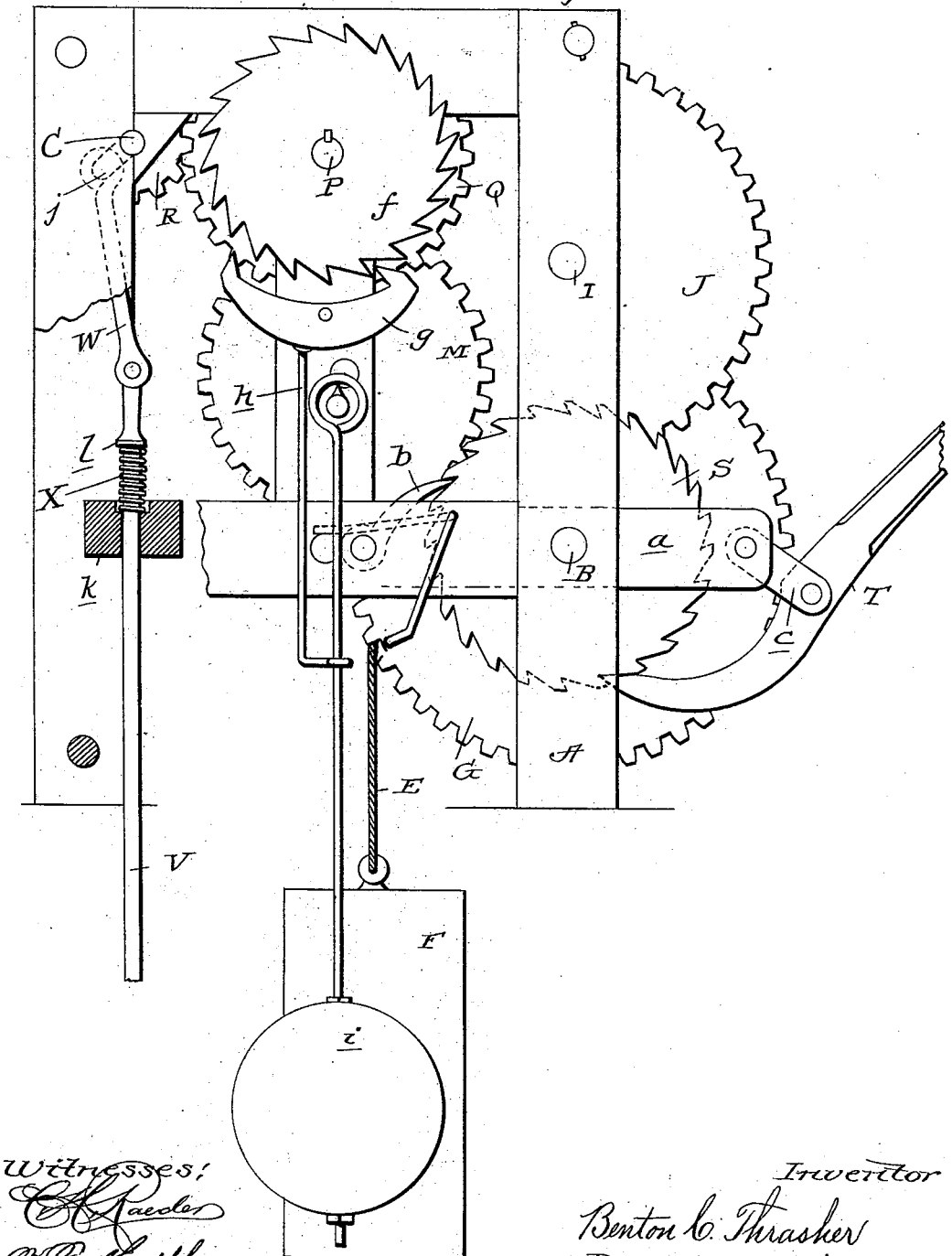

(No Model.)  
3 Sheets—Sheet 3.
B. C. THRASHER.
MOTOR.
No. 512,633.  
Patented Jan. 9, 1894.
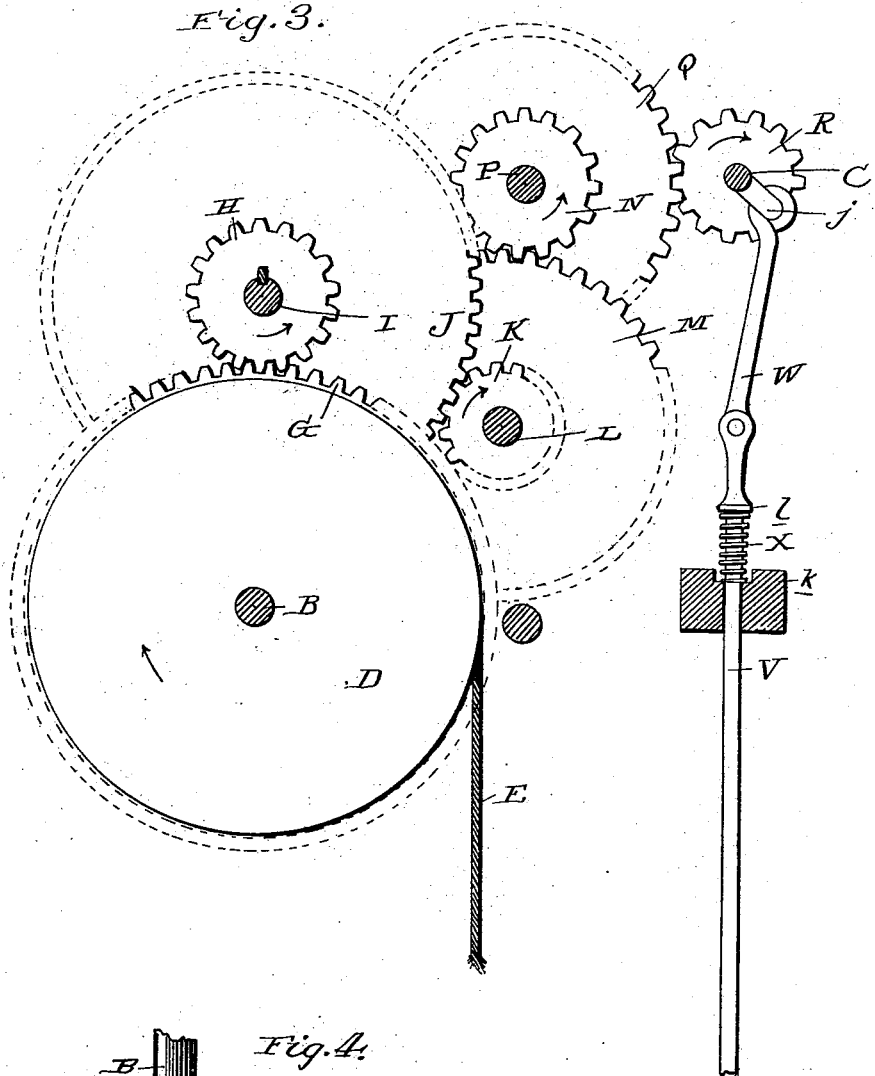
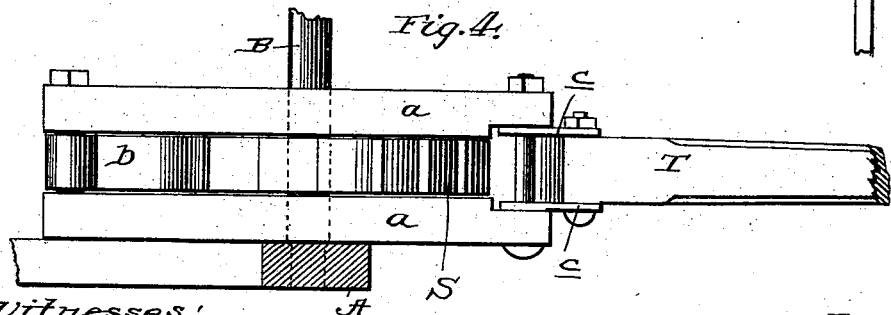
Witnesses:  
Inventor  
Benton C. Thrasher  
By James J. Sheehy  
Attorney

UNITED STATES PATENT OFFICE.

BENTON C. THRASHER, OF VERNON, TEXAS, ASSIGNOR OF FIVE-EIGHTHS TO WARD B. NEWTON AND A. N. EWING, OF SAME PLACE.

MOTOR.

SPECIFICATION forming part of Letters Patent No. 512,633, dated January 9, 1894.

Application filed July 6, 1893. Serial No. 479,722. (No model.)

*To all whom it may concern:*

Be it known that I, BENTON C. THRASHER, a citizen of the United States, residing at Vernon, in the county of Wilbarger and State of Texas, have invented certain new and useful Improvements in Motors for Driving Pumps, Sewing-Machines, and other Machinery; and I do declare the following to be a full, clear, and exact description of the invention, such as will enable others skilled in the art to which it appertains to make and use the same.

My invention relates to improvements in motors for driving pumps, sewing machines, and other light machinery, and it has for its general object to provide such a motor of a cheap, simple, and durable construction, and one which is reliable in operation and which is not liable to get out of order.

A further object of the invention is to provide such a motor with means whereby the weight cord may be quickly and conveniently wound upon its drum.

Other objects and advantages will be fully understood from the following description and claims when taken in connection with the annexed drawings, in which—

Figure 1, is a front elevation of my improved motor. Fig. 2, is a side elevation, partly in section of the same. Fig. 3, is a detail section taken in the plane indicated by the line x, x, of Fig. 1, and Fig. 4, is a detail plan view of the mechanism for winding the weight cord upon its drum.

Referring by letter to said drawings: A, indicates the main frame of the motor which may be of any ordinary or approved construction; B, indicates the drive shaft which is arranged in the rear, lower part of the frame, and C, indicates the crank shaft to which the pitman rod is connected as will be presently described.

Fixed in any approved manner upon the drive shaft B, is the drum D, upon which the cord E, carrying the actuating weight F, is wound. This drum D, is formed integral or fixedly connected with a gear wheel G, and this gear wheel meshes with a pinion H, which is keyed or feathered upon a shaft I, and is consequently adapted to be shifted laterally out of engagement with the gear wheel, for a purpose presently described.

The shaft I, is provided in addition to the slidable pinion H, with a gear wheel J; and motion is transmitted from said shaft I, to the shaft C, through the medium of the train of gearing comprising the said gear wheel J, the pinion K, on the shaft L, the gear wheel M, on said shaft L, the pinion N, on the governor shaft P, the gear wheel Q, on said shaft P, and the pinion R, on the crank shaft. In other words each of the shafts I, L, P, intermediate of the drive shaft B, and the crank shaft C, is provided with a gear wheel and a pinion; and thus the slow motion imparted to the drive shaft by the falling of the weight and the unwinding of the weight cord, is changed to a sufficiently quick motion before its reaches the crank shaft.

S, indicates the ratchet wheel through the medium of which the drive shaft B, is rotated in a reverse direction to wind the weight cord E, upon the drum D. This ratchet wheel is fixed upon the shaft B, in any approved manner, and it is arranged between two bars *a*, which afford a bearing at one end for the pawl *b*, and at their opposite or outer ends a bearing for the links or straps *c*. The pawl *b*, serves to prevent casual movement of the ratchet wheel during the winding operation while the links or straps *c*, serve to effect a loose connection of the pawl-lever T. This pawl lever has its inner end curved and sharpened so as to enable it to engage the teeth of the wheel S, and through the medium of such a lever, it will be perceived that the shaft B, may be quickly and conveniently rotated to wind the weight cord upon the drum, which is a desideratum.

In order to render the rotation of the gearing more smooth and even, I provide in conjunction with the shaft P, which I term the "governor shaft," an escapement mechanism. (See Fig. 2.) This escapement mechanism comprises a ratchet wheel *f*, fixed on the shaft P, a rocking detent *g*, which engages the ratchet wheel and is provided with a depending arm *h*, having a vertically disposed eye at its lower end, and a pendulum *i*, which takes through the eye of the arm *h*, and bears at its upper end upon a knife edge bearing, as shown.

V, indicates the piston rod of a pump or other machine, and W, indicates the pitman which connects the piston rod and the crank branch $j$, of the shaft C. The piston rod W, which takes through a guide bar as $k$, is provided with a head or shoulder $l$; and mounted upon the said rod between its head or shoulder and the guide bar $k$, is a coiled spring X, which assists the piston in overcoming dead centers and consequently renders the working of the pump or other machine more easy. This spring also serves to cushion the piston in its movements and prevents the objectionable shock and jar so often experienced.

In the practical operation of my improved motor, the weight cord is wound upon the drum D, through the medium of the devices described; the pinion H, having been first shifted out of engagement with the gear wheel G, so as to render the rotation of the shaft B, more easy. After the winding of the weight cord is completed, the pinion H, is shifted back into engagement with the gear G, and the pawl lever T, is held, by a loop or other suitable means, out of engagement with the ratchet wheel S. The motor is then ready to be started and this may be effected by simply disengaging the pawl $b$, from the wheel S.

The machine hereinbefore described is designed especially for driving or working a pump or other machinery in which a piston is employed, and the shaft C, is consequently provided with a crank for the connection of the pitman. When however, the machine is designed to run a sewing machine or kindred light machinery, the crank branch $j$, may be dispensed with to give place to a hand wheel.

It will be readily noted from the foregoing description taken in connection with the drawings that my improved motor is very simple and compact; that it is reliable in operation; that it may be wound up when necessary, with the exercise of but very little power, and that it embodies no parts that are liable to get out of order.

Among some of the modifications which might be made in the construction which I have shown and described, an eccentric wheel might be placed on the crank shaft, which would permit of lengthening or shortening the stroke of the pump shaft, without correspondingly lengthening or shortening the crank. In some cases a spring might take the place of the weight such as when using the motor in connection with a sewing machine or other light machinery, and governor balls might be used in place of the pendulum, if necessary.

Having described my invention, what I claim is—

1. In a motor, substantially as described, the combination with a main frame, comprising the parallel bars $a$, the shaft B, journaled in the main frame and extending through the bars $a$, and a ratchet wheel fixed on the shaft and arranged between the bars $a$; of a pawl lever having its inner end curved, and adapted to engage and rotate the ratchet wheel, and links pivotally connected at one end to the pawl lever at an intermediate point of the length thereof and at their opposite ends to the frame, substantially as and for the purpose set forth.

2. The motor herein described, comprising the main frame, the drive shaft B, journaled in the main frame and carrying a fixed drum D, and a ratchet wheel S, a cord wound upon the drum D, and carrying a weight at its end, the drive shaft C, a series of shafts intermediate of the shafts B, and C, gear wheels mounted on the several shafts and adapted to transmit motion from the shaft B, to the shaft C, an escapement mechanism for regulating the rotation of the several shafts consisting of a ratchet wheel mounted on one of the intermediate shafts, a rocking detent engaging said ratchet wheel and having a depending arm provided with a vertically disposed eye, and a pendulum taking through the eye of the detent arm and having an eye at its upper end to engage a knife-edge bearing extending laterally from the main frame, the pawl lever having its inner end curved, and adapted to engage and rotate the ratchet wheel S, and links pivotally connected at one end to the pawl lever at an intermediate point of the length thereof, and at their opposite ends to the frame, all substantially as and for the purpose set forth.

In testimony whereof I affix my signature in presence of two witnesses.

BENTON C. THRASHER.

Witnesses:
JAS. E. DORM,
W. B. NEWTON.